Dec. 15, 1959
E. E. GILBERT
Re. 24,750
INSECTICIDAL COMPOSITIONS CONTAINING A HEXACHLOROCYCLOPENTADIENE DIMER AND METHOD FOR COMBATING NOXIOUS ORGANISMS THEREWITH
Original Filed April 6, 1951
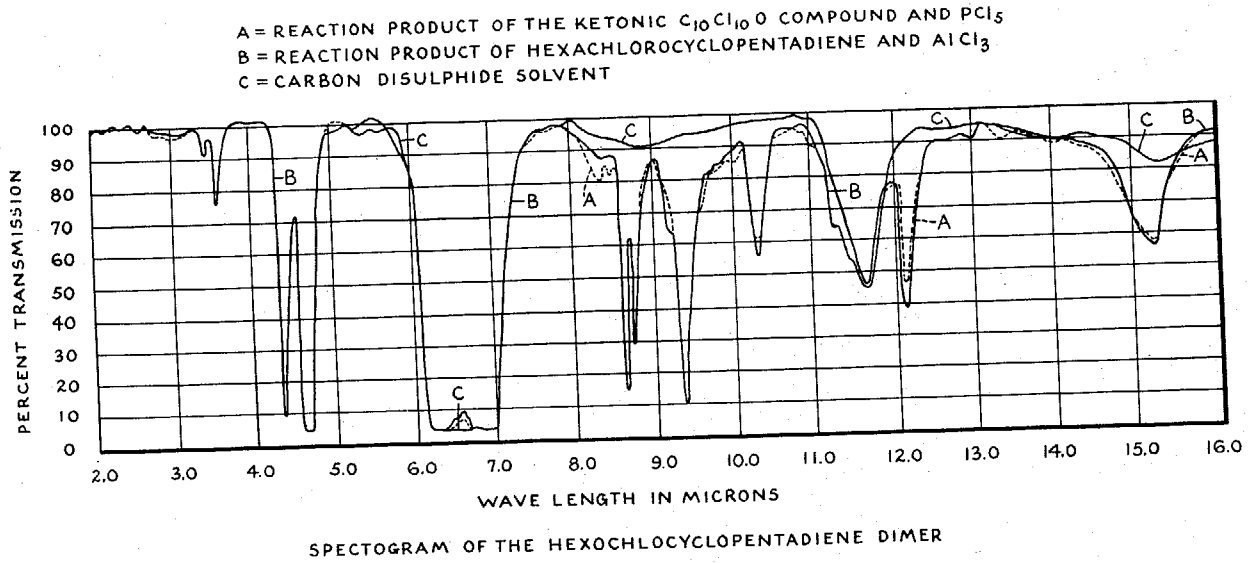
SPECTOGRAM OF THE HEXOCHLOCYCLOPENTADIENE DIMER
INVENTOR
EVERETT E. GILBERT
BY
Elizabeth Hunter
ATTORNEY United States Patent Office Re. 24,750
Reissued Dec. 15, 1959

24,750

INSECTICIDAL COMPOSITIONS CONTAINING A HEXACHLOROCYCLOPENTADIENE DIMER AND METHOD FOR COMBATING NOXIOUS ORGANISMS THEREWITH

Everett E. Gilbert, Morris Township, Morris County, N.J., assignor to Allied Chemical Corporation, a corporation of New York Original No. 2,671,043, dated March 2, 1954, Serial No. 219,740, April 6, 1951. Application for reissue August 19, 1957, Serial No. 679,117

12 Claims. (Cl. 167—30)

Matter enclosed in heavy brackets [ ] appears in the original patent but forms no part of this reissue specification; matter printed in italics indicates the additions made by reissue.

This invention relates to new pesticidal compositions comprising [dodecachlorotetrahydro-4,7-methanoindene] *a hexachlorocyclopentadiene dimer* as the active toxic ingredient and to a method for combating noxious organisms therewith.

[Dodecachlorotetrahydro-4,7-methanoindene is a] *The* dimer of hexachlorocyclopentadiene *of my invention* [which] may be prepared by any suitable process, for example by the condensation of hexachlorocyclopentadiene with aluminum chloride as described in J. Am. Chem. Soc. 71, page 954, March 1949, or by heating [decachlorotetrahydro - 4,7 - methanoindeneone] *the ketonic hydrolyzed reaction product of hexachlorocyclopentadiene with sulfur trioxide,* with $PCl_5$ as described in my copending application Serial No. 219,739, filed April 6, 1951, *now U.S. Patent 2,702,305* according to the reaction indicated below:

$$C_{10}Cl_{10}O + PCl_5 \rightarrow C_{10}Cl_{12} + POCl_3$$

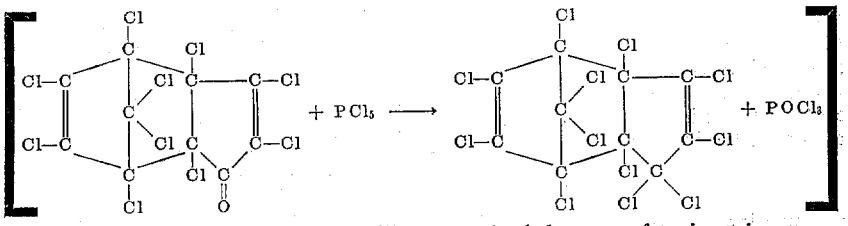

In the drawing, the single figure illustrates the infrared spectrogram of *the* hexachlorocyclopentadiene dimer which comprises the active toxic ingredient of the pesticidal compositions of the invention. The compound prepared by the reaction of $PCl_5$ with [decachlorotetrahydro-4,7-methanoindeneone] *the ketonic hydrolyzed reaction product of hexachlorocyclopentadiene and $SO_3$,* is shown as broken line A in the figure, the compound prepared by condensation of hexachlorocyclopentadiene with $AlCl_3$ is shown as solid line B while the carbon disulfide solvent appears as solid line C. The two spectrograms *A and B* are substantially identical, hence the products prepared by the two processes are identical. *The infrared spectrogram of the hexachlorocyclopentadiene dimer has characteristic absorption peaks at the wave lengths 8.7 microns; 8.9 microns; 9.5 microns; 10.4 microns; 11.3 microns; 12.2 microns and 15.4 microns as clearly shown in the drawing.*

[Dodecachlorotetrahydro - 4,7 - methanoindene] *The hexachlorocyclopentadiene dimer of my invention* is a white crystalline solid which sublimes without melting at temperatures above about 240° C., soluble in benzene, acetone, kerosene and carbon tetrachloride, etc., and while virtually insoluble in methanol, is appreciably soluble in the lower aliphatic alcohols having 2 or more carbon atoms, particularly at elevated temperatures. It has high toxicity against many difficultly controllable noxious organisms including insects and their larvae of the orders Lepidoptera (moths), Coleoptera (beetles), Orthoptera (grasshoppers), etc.

The compositions of my invention comprise as the essential toxic ingredient [dodecachlorotetrahydro-4,7-methanoindene, i.e.] *the* hexachlorocyclopentadiene dimer, which may be applied alone or in association with a fluid or solid carrier material in any suitable manner adapted to combat the particular organism to be controlled. For application as a fluid spray or as an impregnant, the solid [dodecachlorotetrahydro-4,7-methanoindene] *hexachlorocyclopentadiene dimer* may conveniently be dissolved or dispersed in any standard liquid carrier, such as kerosene or the like. For application as a dust or spray powder, it may be mixed or milled with a suitable finely divided solid material, such as clay or the like, together with suitable adjuvants, such as wetting and dispersing agents, anticaking agents, antidusting agents, etc., if desired. It may readily be applied from solution in solvents in which it is soluble, for example in acetone, xylene, and aromatic and aliphatic petroleum solvents, or in mixtures or emulsions of such solvents with water or kerosene, together with suitable emulsifying agents. Application of dodecachlorotetrahydro-4,7-methanoindene in liquid solution form or emulsion form is especially adapted to moth-proofing of fabrics and the like, while application in the form of dusts, wettable powders, or fluid sprays in the form of solutions, dispersions, emulsions or the like, may conveniently be used in its application to vegetable crops.

The concentration of [dodecachlorotetrahydro-4,7-methanoindene] *the hexachlorocyclopentadiene dimer* will vary somewhat with the type of composition, with the organism to be controlled and with surrounding field conditions. In general, surprisingly low concentrations of toxicant in my new compositions give effective insecticidal control in many cases as indicated in the following tables. My compositions, however, will preferably contain at least about 0.5% of [dodecachlorotetrahydro-4,7-methanoindene] *the hexachlorocyclopentadiene dimer* based on the solids content of the compositions. Usually concentrations between about 0.5% and about 30% are satisfactory. These compositions may be diluted somewhat in application as indicated in the tables, especially in the case of the wettable spray powders, and doses applied will vary according to the particular organisms to be controlled, field conditions, etc., as known in the art.

The pesticidal effectiveness of the hexachlorocyclopentadiene dimer is indicated by the following tests.

In Table I below are shown the results of two tests carried out on southern armyworms (Prodenia eridania (Cram.)). In carrying out these tests, leaves of cranberry bean plants were dipped in an agitated suspension of a wettable spray powder prepared by mixing equal parts of clay and [dodecachlorotetrahydro-4,7-methanoindene] *the hexachlorocyclopentadiene dimer* (abbreviated as [DTM] *HCPD* in the table) and a small amount of a wetting agent, and dispersing the resulting "wettable spray powder" in water in the proportion of one pound of powder per 100 gallons of water. After dipping, the leaves were withdrawn, and, in the first of the two tests, were dried three hours and then five 6th instar larvae were confined on the treated plants. Results show percent of larvae dead four days after infestation.

The second test was carried out in the same manner, except that plants were allowed to stand two days after dipping before infestation with larvae in order to determine the residual toxicity of the toxicant.

The results are indicated below:

TABLE I

Toxicity of [dodecachlorotetrahydro-4,7-methanoindene] *the hexachlorocyclopentadiene dimer* to armyworms

| Insect | Dosage Toxicant | Percent Kill |
|---|---|---|
| Southern armyworms | ½ lb. per 100 gals. as wettable spray powder. | 100 |
| Do | ¼ lb. per 100 gals. as wettable spray powder. | 100 |

Table II below shows the results of field tests with [dodecachlorotetrahydro-4,7-methanoindene] *the hexachlorocyclopentadiene dimer* on grasshoppers infesting red clover in comparison with a commercial chlorinated hydrocarbon "chlordane" recommended as highly toxic to grasshoppers. In carrying out the tests, 1200 sq. ft. of clover, infested with three species of grasshopper (red-legged, melanoplus femur-rubrum; lesser migratory, Melanoplus Mexicanus and the two-striped Melanoplus bivittatus, the dominant species being the red-legged), was sprayed with a suspension prepared by mixing clay and [dodecachlorotetrahydro-4,7-methanoindene] *the hexachlorocyclopentadiene dimer,* in the proportion of three parts clay to one part [dodecachlorotetrahydro-4,7-methanoindene] *dimer,* with a small quantity of a wetting agent and dispersing the resulting wettable spray powder in water in proportion of four pounds of the powder (one pound active toxicant) in 100 gallons of water. The "chlordane" composition was prepared and applied in the same manner, except that the powder contained four parts of clay and one part of "chlordane" and was dispersed in water in the proportion of five pounds of powder to 100 gallons of water to produce the same proportion of toxicant per 100 gallons of water. Table II shows the percent reduction in grasshopper population in the infested area after the indicated number of days.

TABLE II

Percent reduction in grasshopper population on clover after treatment with [dodecachlorotetrahydro-4,7-methanoindene] *hexachlorocyclopentadiene dimer*

| Treatment | Percent Reduction in Grasshopper Population After (Days) | | | | | |
|---|---|---|---|---|---|---|
| | 1 | 2 | 3 | 9 | 12 | 14 |
| [DTM] *HCPD*, 25% 4# | 84.1 | 95.5 | 99.1 | 94.4 | 96.7 | 100 |
| Chlordane, 20% 5# | 96.4 | 98.9 | 99.5 | 96.7 | 97.6 | 96.5 |

Table III below shows the results of field tests carried out to determine the residual effectiveness of [dodecachlorotetrahydro-4,7-methanoindene] *the hexachlorocyclopentadiene dimer* against grasshoppers in comparison with "chlordane." In carrying out the tests, separate areas in a field of red clover were sprayed on July 19, with suspensions in water of wettable spray powders containing [dodecachlorotetrahydro-4,7-methanoindene] *the dimer* and "chlordane" respectively, similar to those described above and allowed to stand until August 6 when cages containing 50 grasshoppers were placed over four square feet of each of the treated areas and over a like untreated area. The percent dead five days after exposure to the treated clover in each case is shown in Table III below:

TABLE III

Effect of [dodecachlorotetrahydro-4,7-methanoindene] *the hexachlorocyclopentadiene dimer* on grasshopper infestations occurring 17 days after application to foliage

| Treatment (lbs. per acre) | No. Hoppers | No. Alive After 5 Days | Percent Kill | Feeding |
|---|---|---|---|---|
| [DTM] *HCPD*, 25% 4# | 50 | 9 | 82 | Slight. |
| Chlordane, 20% 5# | 50 | 34 | 32 | Complete defoliation. |
| Check (no toxicant) | 50 | 48 | 4 | Do. |

In Table IV below are shown the results of a test in which 20 x 20 ft. plots of grass were treated with dusts comprising 5% chlordane and 5% [dodecachlorotetrahydro-4,7-methanoindene] *of the hexachlorocyclopentadiene dimer* respectively, with 95% clay, at the rate of ½ pound of active material per acre. Fifty grasshoppers were caged over four square feet of each plot of treated grass within a few hours after treatment. Table IV shows the number and percent of grasshoppers dead after four days.

TABLE IV

Effect of [dodecachlorotetrahydro-4,7-methanoindene] *the hexachlorocyclopentadiene dimer* on infestations of grasshoppers on grass occurring immediately after treatment

| Treatment | No. Hoppers | No. Dead After 4 Days | Percent Dead |
|---|---|---|---|
| [DTM] *HCPD*, 5% Dust | 50 | 43 | 86 |
| Chlordane, 5% Dust | 50 | 39 | 78 |
| Check (no toxicant) | 50 | 3 | 6 |

In Table V below are shown the results of tests of the residual activity of the [dodecachlorotetrahydro-4,7-methanoindene] *hexachlorocyclopentadiene dimer* in comparison with "chlordane." In this test, 50 fresh grasshoppers were caged over portions of grass treated as indicated for the test of Table IV, four days after treatment. Approximately one inch of rain fell the day before the infestation with grasshoppers. The table shows the number and percentage dead four days after infestation.

TABLE V

Residual activity of [dodecachlorotetrahydro-4,7-methanoindene] *the hexachlorocyclopentadiene dimer* against grasshoppers on grass

| Treatment | No. Hoppers | No. Dead After 4 Days | Percent Dead |
|---|---|---|---|
| [DTM] *HCPD*, 5% Dust | 50 | 12 | 24 |
| Chlordane, 5% Dust | 50 | 10 | 20 |
| Check (no toxicant) | 50 | 0 | 0 |

In Table VI below are shown field laboratory tests of [dodecachlorotetrahydro-4,7-methanoindene] *the hexachlorocyclopentadiene dimer* against grasshoppers in comparison with "chlordane" and "toxaphene," the latter being a chlorinated camphene product. In these tests, cranberry bean plants were dusted with compositions containing 3% "chlordane," "toxaphene" and [dodecachlorotetrahydro-4,7-methanoindene] *the hexachlorocyclopentadiene dimer,* respectively, with 97% of clay, using the vacuum method in which the plants are placed in an air tight receptacle together with the dust which is spread on a small platform or holder directly under the evacuation tube of the receptacle. The receptacle is then evacuated, after which the vacuum is quickly released, whereupon the dust is uniformly spread over the test plant by the incoming air stream. Adult grasshoppers of the Melanoplus femur-rubrum species, collected in the field, were confined to the treated plants by means of 6" spherical 16 mesh screen cages and allowed to feed. Table VI shows the mortality of the grasshoppers after 1, 2, 3, 4 and 5 days on plants subjected to varying dosages of the several toxicants. Foliage consumed by grasshoppers was about equal with [DTM] *HCPD* and "chlordane." Significantly more feeding occurred on "toxaphene" dusted plants.

TABLE VI

Toxic effect of [dodecachlorotetrahydro-4,7-methanoindene] *the hexachlorocyclopentadiene dimer* and two commercial grasshopper toxicants against grasshoppers in field laboratory tests on cranberry bean plants

| Treatment | Dust Charge, Mlg. | No. Hoppers | Percent Kill of Hoppers After— | | | | |
|---|---|---|---|---|---|---|---|
| | | | 1 day | 2 days | 3 days | 4 days | 5 days |
| [DTM] *HCPD*, 3% Dust | 25 | 6 | 0.0 | 0.0 | 6.6 | 40.0 | 93.3 |
| | 50 | 6 | 0.0 | 50.0 | 100 | -------- | -------- |
| | 100 | 6 | 0.0 | 83.3 | 100 | -------- | -------- |
| | 200 | 6 | 0.0 | 100 | -------- | -------- | -------- |
| "Chlordane," 3% Dust | 25 | 6 | 0.0 | 6.7 | 26.6 | 53.3 | 93.3 |
| | 50 | 6 | 0.0 | 66.6 | 83.3 | 100 | -------- |
| | 100 | 6 | 0.0 | 83.3 | 83.3 | 100 | -------- |
| | 200 | 6 | 50.0 | 83.3 | 83.3 | 100 | -------- |
| "Toxaphene" | 25 | 6 | 0.0 | 0.0 | 6.7 | 6.7 | 40.0 |
| | 50 | 6 | 0.0 | 33.3 | 50.0 | 66.6 | -------- |
| | 100 | 6 | 33.3 | 100 | -------- | -------- | -------- |
| | 200 | 6 | 100 | -------- | -------- | -------- | -------- |
| Check | None | 18 | 5.5 | 11.1 | 11.1 | -------- | 16.6 |

The effectiveness of the [dodecachlorotetrahydro-4,7-methanoindene] *hexachlorocyclopentadiene dimer* against carpet beetle larvae (Attagenus piceus Oliv.) whose damage is commonly referred to as moth damage is indicated by the following tests carried out according to ASTM Method D–582–49T, entitled "Tentative Methods of Tests for Resistance of Textile Fabrics and Yarns to Insect Pests," published in ASTM Standards for 1949, part V, pages 129–134. In the first test, a 2.28% deposit of [dodecachlorotetrahydro-4,7-methanoidene] *the hexachlorocyclopentadiene dimer* applied to wool from a 1% acetone solution followed by drying, resulted in 100% kill of carpet beetle larvae allowed to feed thereon within a two weeks' exposure period, with 91.8% "protection" to the fabric, i.e. with only 8.2% loss of weight of the original cloth swatch from feeding of the larvae.

In a second test, the same swatch, with no further treatment, retested with fresh larvae after eight months storage, again exhibited 100% kill and 95% protection against the larvae indicating no loss of toxicity on storage.

A test similar to those described above was run in which 1.3% of [dodecachlorotetrahydro-4,7-methanoindene] *the hexachlorocyclopentadiene dimer* was deposited on wool from a 0.5% acetone solution. After eight months' storage, the treated wool was exposed to carpet beetle larvae as before. 100% of the larvae were killed, the deposit effecting 97% protection of the wool.

While the above describes the preferred embodiments of my invention, it will be understood that departures may be made therefrom within the scope of the specification and claims.

I claim:

1. A new insecticidal composition comprising [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrograms shown at A and B in the drawing having characteristic absorption peaks at the wave lengths 8.7 microns; 8.9 microns; 9.5 microns; 10.4 microns; 11.3 microns; 12.2 microns and 15.4 microns; together with a dispersing agent* and an inert insecticidal adjuvant as carrier for the insecticide.

2. A new insecticidal composition comprising [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing having characteristic absorption peaks at the wave lengths 8.7 microns; 8.9 microns; 9.5 microns; 10.4 microns; 11.3 microns; 12.2 microns and 15.4 microns; together with a dispersing agent* and an inert liquid adjuvant as carrier for the insecticide.

3. A new insecticidal composition comprising [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing having characteristic absorption peaks at the wave lengths 8.7 microns; 8.9 microns; 9.5 microns; 10.4 microns; 11.3 microns; 12.2 microns and 15.4 microns; together with a dispersing agent* and an inert insecticidal dust adjuvant as carrier for the insecticide.

4. An insecticidal dust adapted for the control of insects of the order Orthoptera comprising a mixture of at least about 0.5% of [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing having characteristic absorption peaks at the wave lengths 8.7 microns; 8.9 microns; 9.5 microns; 10.4 microns; 11.3 microns; 12.2 microns and 15.4 microns; together with a dispersing agent* and an inert dust insecticidal adjuvant as carrier for the insecticide.

5. An insecticidal wettable spray powder adapted for the control of insects of the order of Orthoptera comprising a mixture of at least about 0.5% of [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns* an inert dust insecticidal adjuvant as carrier for the insecticide and a wetting agent.

6. An insecticidal wettable spray powder suspension adapted for the control of insects of the order Orthoptera comprising a mixture of at least about 0.5% of [dodecachlorotetrahydro-4,7-methanoindene] *a hexachlorocyplopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns* and an inert dust insecticidal adjuvant as the carrier for the insecticide suspended in an inert liquid insecticidal adjuvant as the carrier for the insecticide.

7. A method for controlling insects which comprises contacting said organisms with a composition containing as the essential toxic ingredient [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns.*

8. A method for controlling grasshopper infestations on field crops which comprises contacting grasshoppers with a composition containing as the essential toxic ingredient, [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns.*

9. A method for controlling carpet beetle damage on wool which comprises impregnating the wool with a composition containing as the essential toxic ingredient, [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns.*

10. A method for controlling grasshopper infestations on field crops which comprises applying to the crops a dust comprising between about 0.5% and about 30% of [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns* and an inert dust insecticidal adjuvant as the carrier for the insecticide, at the rate of between about ⅛ lb. and about 1 lb. of toxicant per acre.

11. A method for controlling grasshopper infestations on field crops which comprises applying to the crops a liquid suspension comprising between about 0.5% and about 30% of [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns* based on the solid content of the composition and an inert dust insecticidal adjuvant as the carrier for the insecticide suspended in a liquid insecticidal adjuvant as the carrier for the insecticide at the rate of between about ⅛ pound and about 1 pound toxicant per acre.

12. A method for controlling grasshopper infestations on field crops which comprises applying to the crops a liquid suspension comprising between about 0.5% and about 30% of [dodecachlorotetrahydro-4,7-methanoindene] *a hexachlorocyclopentadiene dimer having the empirical formula $C_{10}Cl_{12}$, the property of subliming without melting at temperatures above about 240° C., being soluble in benzene, acetone, kerosene, carbon tetrachloride, insoluble in methanol and appreciably soluble at elevated temperatures in the lower aliphatic alcohols having 2 or more carbon atoms, having the infrared spectrogram shown at A and B in the drawing and having characteristic absorption peaks at the wave lengths 8.7 microns; 8.9 microns; 9.5 microns; 10.4 microns; 11.3 microns; 12.2 microns and 15.4 microns* based on the solid content of the composition and an inert dust insecticidal adjuvant as carrier for the insecticide, suspended in water.

References Cited in the file of this patent or the original patent

| | | |
|---|---|---|
| 2,519,190 | Hyman | Aug. 15, 1950 |
| 2,548,509 | Yowell | Apr. 10, 1951 |
| 2,561,209 | Kittleson et al. | July 17, 1951 |
| 2,616,825 | Gilbert et al. | Nov. 4, 1952 |
| 2,724,730 | Johnson | Nov. 22, 1955 |

OTHER REFERENCES

J. A. C. S., 71, 954 (1949).